(12) United States Patent
Peck

(10) Patent No.: US 11,372,745 B2
(45) Date of Patent: *Jun. 28, 2022

(54) CONTEXT-SENSITIVE DEBUG REQUESTS FOR MEMORY ACCESS

(71) Applicant: TEXAS INSTRUMENTS INCORPORATED, Dallas, TX (US)

(72) Inventor: Jason Lynn Peck, Houston, TX (US)

(73) Assignee: Texas Instmments Incorporated, Dallas, TX (US)

( * ) Notice: Subject to any disclaimer, the term of this patent is extended or adjusted under 35 U.S.C. 154(b) by 56 days.

This patent is subject to a terminal disclaimer.

(21) Appl. No.: 16/827,081

(22) Filed: Mar. 23, 2020

(65) Prior Publication Data
US 2020/0285561 A1 Sep. 10, 2020

Related U.S. Application Data

(63) Continuation of application No. 15/710,132, filed on Sep. 20, 2017, now Pat. No. 10,599,555.

(51) Int. Cl.
*G06F 11/00* (2006.01)
*G06F 11/36* (2006.01)
*G06F 9/455* (2018.01)

(52) U.S. Cl.
CPC ........ *G06F 11/366* (2013.01); *G06F 9/45558* (2013.01); *G06F 11/362* (2013.01); *G06F 2009/45591* (2013.01)

(58) Field of Classification Search
CPC ............... G06F 11/366; G06F 11/3656; G06F 11/3013; G06F 11/0721; G06F 11/0736; G06F 11/079; G06F 11/2236; G06F 11/3648; G06F 11/3476; G06F 2009/45591; G01R 31/31705
See application file for complete search history.

(56) References Cited

U.S. PATENT DOCUMENTS

| | | | |
|---|---|---|---|
| 6,077,312 A | 6/2000 | Bates et al. | |
| 7,334,161 B2 * | 2/2008 | Williams | G06F 11/3648 714/34 |
| 8,261,047 B2 | 9/2012 | Moyer et al. | |
| 10,599,555 B2 * | 3/2020 | Peck | G06F 11/362 |
| 2002/0184477 A1 | 12/2002 | Swaine et al. | |
| 2006/0075310 A1 * | 4/2006 | Tagawa | G06F 11/364 714/45 |

(Continued)

*Primary Examiner* — Marc Duncan
(74) *Attorney, Agent, or Firm* — Brian D Graham; Charles A. Brill; Frank D. Cimino

(57) ABSTRACT

Disclosed embodiments include a processing device having a debug controller that issues a context-sensitive debug request. The context-sensitive debug request includes at least one conditional criteria. A processing core receives the debug request, determines whether all of the at least one conditional criteria are true, and services the debug request when all of the at least one conditional criteria are true by accessing a data location indicated in the debug request. The servicing of the debug request may be performed in real-time mode without suspending the processing device, and the accessing can be a read or a write operation depending on the type of access indicated in the debug request. The conditional criteria may include one or more of a processor mode condition, a virtual machine identifier condition, and a debug context condition.

20 Claims, 3 Drawing Sheets

(56) References Cited

U.S. PATENT DOCUMENTS

2009/0037703 A1 2/2009 Burdick et al.
2009/0193297 A1 7/2009 Williams et al.
2016/0062874 A1* 3/2016 Brites ................ G06F 11/3636
          717/129

* cited by examiner

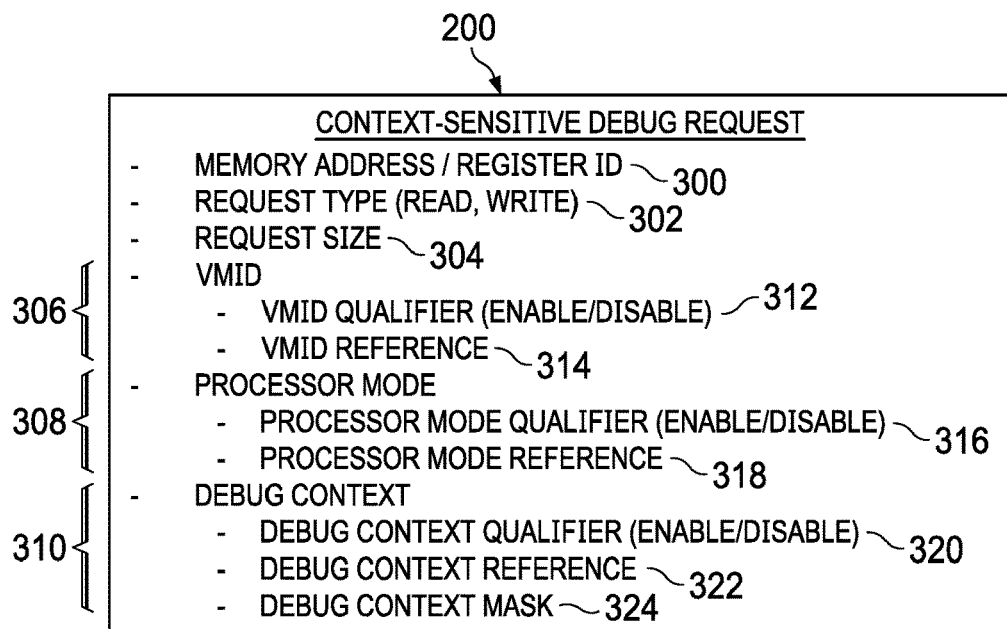
FIG. 3
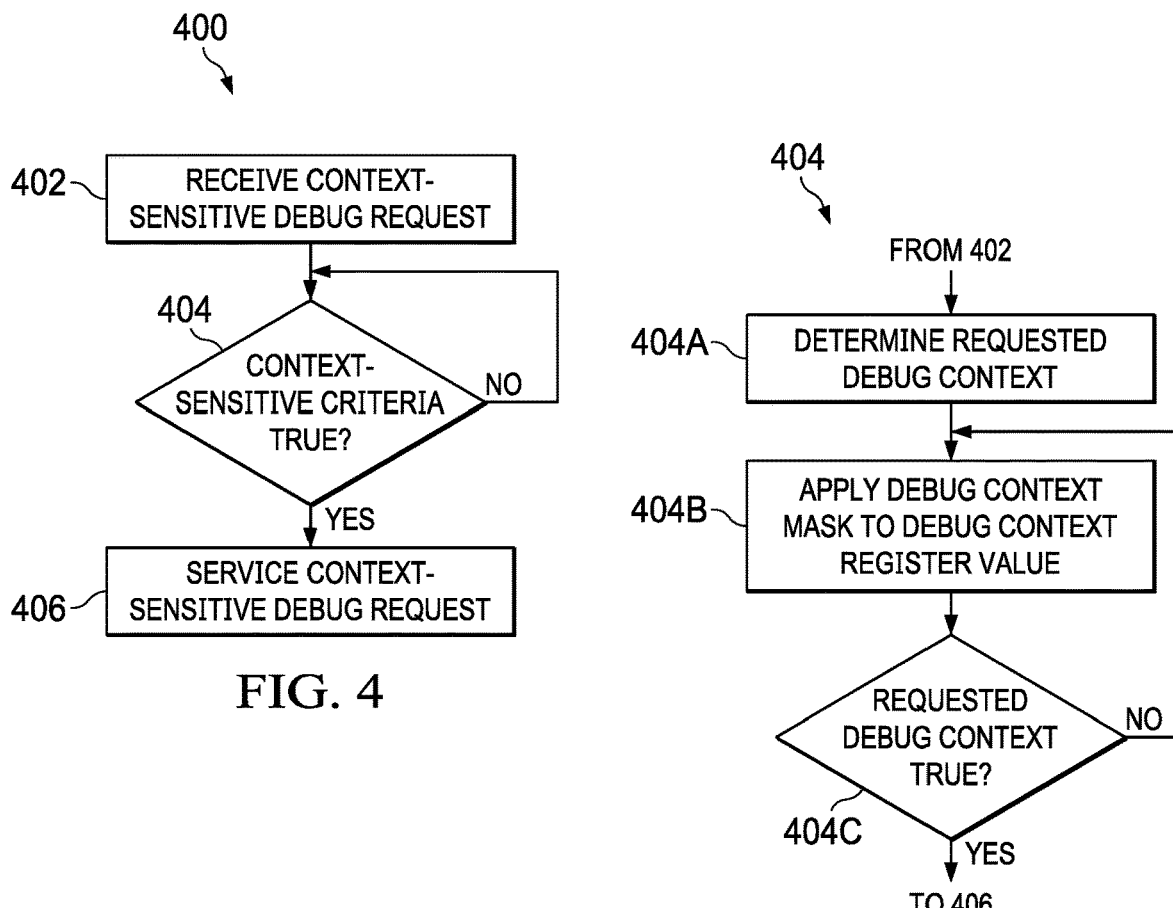
FIG. 4
FIG. 5

CONTEXT-SENSITIVE DEBUG REQUESTS FOR MEMORY ACCESS

CROSS-REFERENCE TO RELATED APPLICATIONS

This application is a continuation of U.S. patent application Ser. No. 15/710,132, filed Sep. 20, 2017, which is incorporated by reference herein in its entirety.

BACKGROUND

This section is intended to introduce the reader to various aspects of art that may be related to various aspects of the subject matter described and/or claimed below. This discussion is believed to be helpful in providing the reader with background information to facilitate a better understanding of the various aspects of the present disclosure. Accordingly, these statements are to be read in this light, not as admissions of prior art.

The present disclosure relates generally to debugging. More specifically, embodiments disclosed herein relate to non-intrusive debug techniques in processor-based systems.

Debug is the process of identifying errors or "bugs" that prevent a computing system, such as a processor-based system, from operating correctly. As used herein, a processor-based system refers to an electronic system that includes one or more processors, such as single-core and/or multi-core processors. The goal of debug is to identify and resolve such errors. For example, software-related errors may be corrected by revising a portion of executable code, such as application code or firmware, causing the error, while errors that are determined to be hardware-related may require a hardware revision, such as a new stepping level of a processor. In any case, debugging enables developers and designers to identify a root cause of an error and implement an appropriate solution to correct it.

Processor-based systems may include on-chip features to support debugging, such as a debug interface, dedicated debug interconnects, hardware breakpoints, dedicated debug registers and/or caches, and so forth. While specific debug functionality and features may vary depending on processor architecture, one basic debug feature is the ability to retrieve (e.g., read) and manipulate (e.g., write) memory and register contents from the perspective of a processor. Many conventional implementations have required that a processor be in a suspended state in order to service a debug request involving a memory or register access.

In traditional debugging, when a debug request to access memory or a register, such as a program counter, is received, the processor temporarily enters a suspended state, processes the request, and then restarts. This type of debug, sometimes referred to as "stop mode" debug, is intrusive because the processor must stop all threads and prevent interrupts from being handled while servicing the debug request (e.g., reading from or writing to a particular memory address or register). Intrusive debug is undesirable for applications that rely on time critical deadlines. For instance, in a processor-based system that controls the spinning of a motor or the regulation of a power supply, it is undesirable for the processor to halt, even momentarily.

Due to the real-time nature of many modern systems, it is desirable to reduce the intrusiveness of debug. More recently, some processor architectures have been designed to support debug in "real-time" mode. In real-time mode, contents of memory and register locations can be retrieved and modified while the processor continues to execute code. For example, the processor may be halted for debug purposes, but will still respond to and service time critical interrupts.

As processor technology continues to increase in both complexity and speed, the debugging of electronic systems, such as embedded processing systems, has become increasingly challenging. For example, some processor-based systems can now implement virtualized environments capable of running multiple operating systems. Accordingly, a debug request to access a particular memory address or register is of little use without knowledge of the particular process and/or operating system that is executing.

SUMMARY

The brief summary in this section is provided to familiarize the reader with certain aspects and contexts of embodiments of the present disclosure without limitation to the claimed subject matter.

In accordance with one aspect of the disclosure, a processing device includes a debug controller that issues a context-sensitive debug request including at least one conditional criteria. The processing device includes a processing core that receives the context-sensitive debug request, determines whether all of the at least one conditional criteria are true, and services the context-sensitive debug request when all of the at least one conditional criteria are true. Servicing of the context-sensitive debug request includes accessing a data location indicated by the context-sensitive debug request.

In accordance with another aspect of the disclosure, a method for servicing debug requests in a processor includes receiving a debug request that includes a data location, a request type, and at least one conditional criteria, determining whether all of the at least one conditional criteria are true, when all of the at least one conditional criteria are true, servicing the debug request by accessing the data location indicated in the debug request, and, when any of the at least one conditional criteria is not true, waiting for all of the at least one conditional criteria to become true and then servicing the debug request or canceling the debug request in response to a processor reset event or a request to cancel the debug request.

In accordance with a further aspect of the disclosure, an electronic system includes a processor having an input that receives debug information, a debug controller that generates a debug request responsive to the debug information, the debug request including a data location, an access request type that indicates one of a read or a write operation, and at least one context-based conditional criteria including at least one of a virtual machine identifier (VMID) condition, a processor mode condition, and a debug context condition, and a processing core that receives the debug request, determines whether all of the at least one context-based conditional criteria are true, and services the debug request when all of the at least one context-based conditional criteria are true by accessing the data location and performing a read or a write operation depending on the access request type.

BRIEF DESCRIPTION OF THE DRAWINGS

Various aspects of this disclosure may be better understood upon reading the following detailed description and upon reference to the drawings in which:

FIG. 3 is an example embodiment of a context-sensitive debug.

FIG. 4 is a flowchart that depicts the processing of a context-sensitive debug request by a processor in accordance with a disclosed embodiment.

FIG. 5 is a flowchart depicting, in more detail, the step of determining whether a requested debug context is met in accordance with a disclosed embodiment.

DETAILED DESCRIPTION

One or more example embodiments of the present disclosure are described below. In an effort to provide a concise description of these embodiments, all features of an actual implementation may not be described in the specification. It should be appreciated that in the development of any such implementation, as in any engineering or design project, numerous implementation-specific decisions are made to achieve the developers' specific goals, such as compliance with system-related and business-related constraints, which may vary from one implementation to another. Moreover, it should be appreciated that such development efforts might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. The embodiments discussed below are intended to be examples that are illustrative in nature and should not be construed to mean that the specific embodiments described herein are necessarily preferential in nature. Additionally, it should be understood that references to "one embodiment" or "an embodiment" within the present disclosure are not to be interpreted as excluding the existence of additional embodiments that also incorporate the recited features.

The present disclosure relates to non-intrusive debug techniques in processor-based systems using debug requests that are context-sensitive. As used herein, "context" refers to some conditional criteria that, when true, allows a processor to service the request while running or otherwise delays the servicing of the request until the condition is met. Accordingly, disclosed embodiments include, without limitation, an electronic device including a processor-based system that services context-sensitive debug requests for register or memory access, a debug controller that issues such context-sensitive debug requests, as well as related methods for the servicing of such context-sensitive debug requests.

Figure 1:
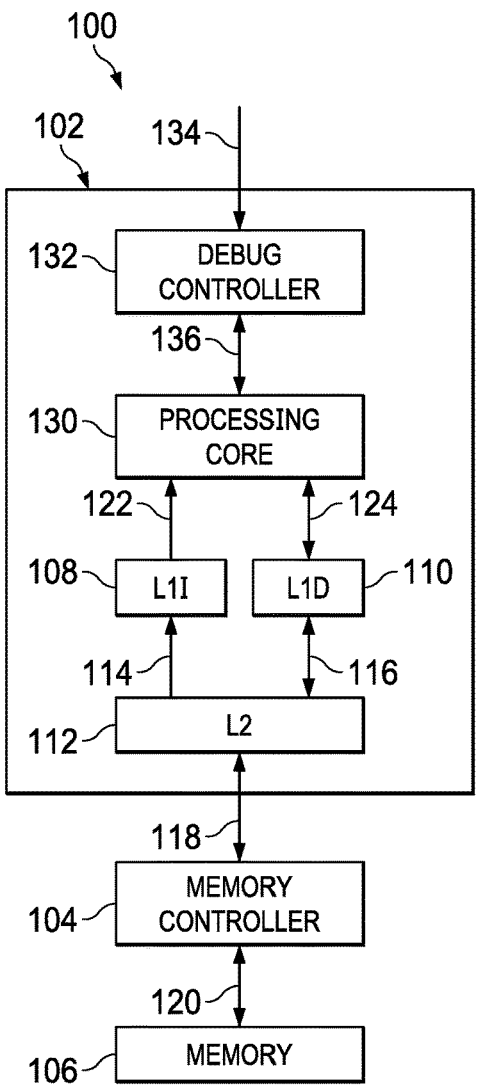
FIG. 1 is processor-based system in accordance with a disclosed embodiment.

FIG. 1 is an example embodiment of a processor-based system 100. The system 100 includes processor 102, memory controller 104, and memory 106. Processor 102 includes caches, such as a level one instruction cache (L1I) 108, a level one data cache (L1D) 110, and a level two combined instruction and data cache (L2) 112 which holds both instructions and data. L2 cache 112 is connected to L1I cache 108 and L1D cache 110 by buses 114 and 116, respectively. In one embodiment, L2 cache 112 may store instructions to back up L1I cache 108 and data to back up L1D cache 110, and L2 cache 112 may itself be further connected to a high level cache (e.g., L3 cache, not shown in this embodiment) and/or to main memory 106 through memory controller 104. L2 cache 112, in this embodiment, is connected to memory controller 104 by bus 118, and memory controller 104 is connected to memory 106 by bus 120. As further shown, L1I cache 108 and L1D cache 110 are connected to processing core 130 by way of buses 122 and 124, respectively. In one embodiment, caches 108, 110, 112 may be implemented as static RAM (SRAM).

Processing core 130 includes one or more functional units that execute instructions. In one embodiment processing core 130 may include a scalar datapath and a vector datapath. For example, each data path includes corresponding control registers, register files, and functional units, such as instruction fetch, instruction dispatch, and instruction decode units that together provide for execution of instructions. Instructions executed by processing core 130 can be fetched from L1I cache 108 upon a cache hit (e.g., indicating such instructions are stored in L1I cache 108) or may be fetched from a higher level cache, such as L2 cache 112, or from memory 106 upon a cache miss.

Processor 102 also includes debug controller 132 having an input connected to bus 134 that receives debug information. Debug information can include debug configuration information supplied from a debugger (e.g., debug software interfacing with processor-based system 100) or from external debug logic. Such debug logic may include suitably configured circuitry located in one or more components of the processor-based system 100 that are external from the perspective of processor 102, but not necessarily a separate circuit (e.g., a separate integrated circuit). In some embodiments, the processor-based system 100, including memory controller 104, memory 106, and other components not specifically illustrated in FIG. 1, such as the aforementioned external debug logic, may be formed as a single integrated circuit. For example, the processor-based system 100 may be a system-on-a-chip (SOC) integrated circuit in one embodiment.

Debug information received via bus 134 may indicate to debug controller 132 memory address(es) and/or register(s) to which access is being requested. In accordance with disclosed embodiments, such debug information can also include context-sensitive information, and debug controller 132 is configured to issue context-sensitive debug requests to processing core 130 (via bus 136) based on context-sensitive information, as will be discussed further with respect to the various embodiments and examples described below.

In FIG. 1, the example processor 102 is illustrated with a single processing core 130, but it will be understood that processor 102 can be a "multi-core" processor in other embodiments and, as such, can include multiple processing cores (e.g., 2, 4, 8, or more cores), where each processing core has its own respective debug controller. Processor 102 may be any suitable type of microprocessor capable of executing instructions, such as a central processing unit (CPU), embedded processor, microcontroller, digital signal processor (DSP), graphics processor, or any other type of general-purpose or application-specific processor.

Figure 2:
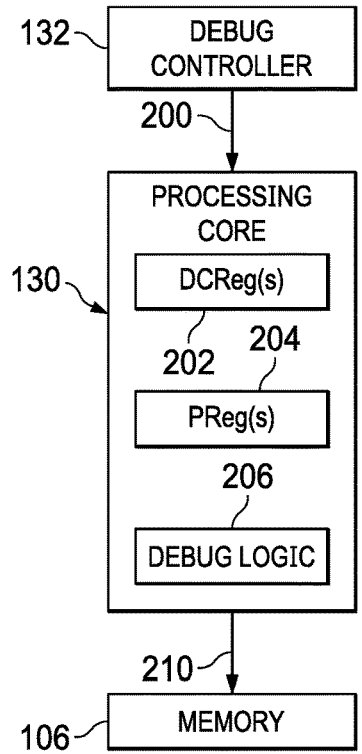
FIG. 2 is a diagram illustrating a memory access in response to a context-sensitive debug request in accordance with a disclosed embodiment.

FIG. 2 is a diagram illustrating a memory access in real-time mode that is responsive to a context-sensitive debug request 200. Context-sensitive debug request 200 is sent to processing core 130 by debug controller 132. Processing core 130 includes one or more debug context registers 202 (DCReg(s)) and one or more processor registers 204 (PReg(s)). Debug context registers 202 are general purpose registers that can be configured (e.g., user-configured) to track or otherwise store information of interest, such as active threads, processes, and tasks. Such information may be referred to herein as debug context information. Depending on the type of information debug context register 202 is configured to store, that information may be regularly updated by processing core 130. For example, processing core 130 may regularly update debug context register 202 so that it indicates an identifier of the current active process being executed by processing core 130. Processor registers 204 are additional register locations accessible by processing core 130, for example, a program counter, an instruction register, or address and data registers. Debug registers 202 may be considered as a type of processor register 204, but are specifically assigned to store debug context information in this embodiment.

As discussed above, debug request 200 is context-sensitive in that is includes one or more conditional criteria, and processing core 130 determines whether to service debug request 200 depending on whether the conditional criteria is true. In the illustrated embodiment, processing core 130 includes debug logic 206 that evaluates whether the conditional criteria in debug request 200 are met. Debug logic 206 can be implemented as part of the circuitry of processing core 130, such as a logic circuit or group of logic circuits within the circuitry of processing core 130. When debug logic 206 indicates that the context-sensitive conditional criteria is true, processing core 130 services debug request 200 by accessing 210 main memory 106 in the depicted example. For instance, accessing 210 can include accessing an address in memory 106 that is indicated in debug request 200, which can also include information specifying whether the access type will be a write or a read operation. While this example shows the accessing of main memory 106 in response to servicing debug request 200, processing core 130 can also access a register, such as one or more of DCRegs 202 or PRegs 204, or may access local memory, such as an address location in one of caches 108, 110, and/or 112.

FIG. 3 shows, in greater detail, an example of context-sensitive debug request 200 in accordance with one disclosed embodiment. Debug request 200 includes data access location information 300, request type information 302, request size information 304, virtual machine identification (VMID) information 306, processor mode information 308, and debug context information 310. Access location information 300 indicates a location to which access is being requested, and can include a memory address or a register identifier (ID). Request type 302 indicates whether the request is a write or a read request, i.e., a request to write a value to data location 300 or read a value from data location 300. Request size 304 specifies the size (e.g., in bits) of a requested transaction. In this embodiment, location 300, request type 302, and request size 304 can be considered as standard fields in debug request 200 that are not part of the conditional criteria.

Conditional criteria of debug request 200 are specified by VMID information 306, processor mode information 308, and debug context information 310, any combination of which can be used to provide context-sensitive parameters. VMID information 306 can be used to identify a particular virtual machine as a condition of servicing debug request 200. For example, processor-based system 100 of FIG. 1 may be a virtualized system in one embodiment that provides for the emulation of multiple systems (virtual machines) that may execute different operating systems.

VMID information 306 includes VMID qualifier 312 and VMID reference 314. VMID qualifier 312 is a field that allows a user to enable or disable VMID as a condition. For instance, VMID qualifier 312 may be implemented as a bit in debug request 200, with a first value (e.g., 1) indicating that debug request 200 will respect (e.g., be conditioned upon) a particular VMID and with a second value (e.g., 0) indicating that debug request 200 will ignore (e.g., is not conditioned upon) the VMID context. VMID reference 314 provides a reference value to which a current active VMID of processing core 130 (e.g., a VMID associated with a current instruction being executed) is compared against. Thus, when VMID qualifier 312 indicates debug request 200 will respect a VMID context, the servicing of debug request 200 depends on whether the current active virtual machine matches the VMID indicated in VMID reference 314. Processor-based system 100 may run any desired number of virtual machines, with each virtual machine instance having a unique identifier, such as a multi-bit value or string.

Processor mode information 308 includes processor mode qualifier 316 and processor mode reference 318. Processor 102 may support multiple processor modes, such as a user mode and a supervisor mode. In some embodiments, user and supervisor modes may be further distinguished by different levels of permissions, such as a guest, root, and secure user modes as well as guest, root, and secure supervisor modes. One such embodiment may implement a TrustZone™ security model from ARM Ltd. Other embodiments may implement different types and numbers of processor modes depending, for example, on a given processor architecture.

Like VMID qualifier 312, processor mode qualifier 316 represents a field that allows a user to enable or disable processor mode as a condition. Processor mode qualifier 316 may be implemented as bit in debug request 200, with a first value (e.g., 1) indicating that debug request 200 will respect the processor mode context and with a second value (e.g., 0) indicating that debut request 200 will ignore the processor mode context.

Processor mode reference 318, in one embodiment, may be implemented as a bit-wise encoding of available processor modes supported by processor-based system 100. The encoding allows for debug request 200 to be conditioned against any combination of possible processor modes. As an example, in an embodiment that supports eight different processor modes, processor mode reference 318 may be implemented as an eight-bit field, with each bit representing one of the processor modes. Thus, each processor mode that debug request 200 will respect may have its corresponding bit in the field set to a first value, such as a 1, with remaining processor modes set to a second value, such as a 0. By way of example, suppose the field corresponding to processor mode reference 318 indicates the following bits: 0 0 0 1 0 1 1 0. Then, debug request 200 will be serviced when processing core 130 is operating in any of the three processor modes corresponding to the bits that have a value of 1.

Debug context information 310 includes debug context qualifier 320, debug context reference 322, and debug context mask 324 and can represent, generally, any other user-defined context-sensitive condition of interest other than VMID and processor mode. By way of example, debug context information 310 may be used to condition (in addition to or independently of VMID and processor mode contexts) the servicing of debug request 200 on a particular thread, process, or task being active. Debug context qualifier 320 is a field that allows a user to enable or disable debug context as a condition for servicing debug request 200. It may be similarly implemented as a bit in debug request 200, with a first value (e.g., 1) indicating that debug request 200 will respect a debug context and with a second value (e.g., 0) indicating that debug request 200 will ignore the debug context.

When debug context qualifier 320 is enabled, debug context information of interest is specified by debug context reference 322 as well as debug context mask 324. Debug mask 324 is used to specify specific bits of debug context register 202 that are of interest. The encoding of debug context register 202 may be defined as part of the architecture of processor 102 and/or may be user configured. For instance, debug context register 202 may be a 32-bit register in one embodiment with the entire register being configured as a 32-bit field, or can be divided into multiple fields indicating different information. Suppose that for this debug request 200, the debug context of interest is a current process ID stored in the lowest eight bits (e.g., bits 0 to 7) of debug context register 202. A debug mask corresponding to 0000 0000 0000 0000 0000 0000 1111 1111 is applied to both the debug context reference 322 and the value stored in debug context register 202 using a bit-wise AND operation. In this example, since only the lowest eight bits are used for the comparison, the desired state of the lowest eight bits of debug context register 202 are provided in debug context reference 322 while remaining bits (e.g., the remaining 24 bits) are irrelevant in this case since they will be masked out by debug mask 324. This effectively allows for debug context reference 322 to be compared with only the specific bits of interest in debug context register 202. Accordingly, when the value of debug context reference 322 with debug mask 324 applied matches the value of debug context register 202 with debug mask 324 applied, then the debug context condition is met and debug request 200 is serviced by processing core 130 (assuming other conditions in the request, such as VMID and/or processor mode, are also met). As used herein, conditional criteria associated with debug request 200 is understood to mean all enabled conditions of debug request 200, i.e., all reference fields (e.g., 314, 318, 322) that are enabled by their respective qualifier fields (e.g., 312, 316, 320). Thus, conditions associated with reference fields that are disabled are not considered part of the conditional criteria of a context-sensitive debug request 200.

The determination of whether context-sensitive conditions in debug request 200 are true may be performed by debug logic 206 of processing core 130. FIG. 4 is a flowchart of process 400 illustrating the determination by processing core 130 whether to service debug request 200. At step 402 of process 400, debug request 200 with one or more context-sensitive conditions is received by processing core 130. As described in FIG. 3, such conditions can include VMID, processor mode, and/or some other debug context, such an active process. Qualifier data 312, 316, and 320 will indicate to processing core 130 which conditions are enabled (e.g., the conditional criteria). Processing core 130 then executes decision step 404 to determine whether all of the context-sensitive conditional criteria set forth in debug request 200 are true. If all of the context-sensitive conditional criteria are determined to be true, debug request 200 is serviced at step 406, for example, by accessing a memory address or register location identified in debug request 200. If any of the context-sensitive conditional criteria is not true, processing core 130 may wait until all the conditions are determined to be true or, as will be described in more detail with reference to the state machine shown in FIG. 6, until debug request 200 is canceled, processor 102 is reset, or a new debug context is received.

FIG. 5 illustrates decision step 404 of FIG. 4 in more detailed as applied to debug context information 310. Step 404A determines the requested debug context in debug request 200. For example, this may include applying debug mask 324 to debug context reference 322 using a bit-wise AND operation. This specifies the bits that are to be compared with a value in debug context register 202. Step 404B applies debug mask 324 to the value stored in debug context register 202 to obtain the bits against which the debug context determined at 404A is to be compared. Decision step 404C determines whether the debug context indicated by debug context information 310 matches the corresponding information in debug context register 202. If the condition is true, the process continues to step 406 and debug request 200 is serviced. If the condition is not true, then the process may return to step 404B and wait until the condition is determined to be true (or debug request 200 is canceled).

It will be appreciated that processing core 130 may include various logic gates, comparators, or other circuitry that are designed to execute the process shown in FIGS. 4 and 5. Such circuitry may make up all or part of debug logic 206.

The context-sensitive debug techniques described herein are particularly useful as the complexity of processing systems continues to increase as it permits debug operations in real-time mode with reduced intrusiveness and increased flexibility. By way of an example only, suppose debug request 200 has each of the VMID, processor mode, and debug context qualifiers enabled, with VMID reference 314 indicating a particular instance of Linux, processor mode reference 318 indicating a secure supervisor mode, and debug context reference 322 indicating a grep function. Thus, on receiving this debug request 200, processing core 130 will determine whether the current VMID (e.g., VMID associated with the current instruction being executed) matches VMID reference 312, whether the current processor mode matches processor reference 318, and whether debug context register 202 indicates a current process ID corresponding to a grep command. When all of these conditions are true, then processing core 102 services debug request 200 by accessing a memory address or register specified in debug request 200.

In another example, debug context reference 322 may indicate a unique identifier corresponding to a particular function in a segment of code of an application being executed. For instance, a programmer may compile the application code so that it is instrumented in such a way that when a particular function or routine is called, a unique identifier is stored into debug context register 202. Thus, the servicing of debug request 200 can be conditioned upon whether the specific function or routine corresponding to that unique identifier is being executed.

In yet another example, debug context register 202 may store one or more values indicating the state of a peripheral device connected to processor-based system 100. Thus, debug request 200 can be conditioned depending on whether the peripheral device is active or inactive. For instance, it may be desirable to not access a particular memory location when the peripheral device is active.

It is understood that some embodiments can include multiple debug context registers 202 and, as such, more than one debug context reference could be included as part of debug context information 310. In such embodiments, each debug context reference can have a corresponding mask that is applied to it as well as a corresponding one of debug context registers. In other embodiments, multiple debug context references can be compared against different sets of bits in the same debug context register, such as in an embodiment where debug context register is encoded into multiple fields. Using the example described above, in one embodiment, the lowest eight bits of a 32-bit debug context register may store an active process ID while some or all of the upper 24 bits of the register may store other information, such as the unique identifier and/or peripheral device state mentioned above. Thus, the servicing of debug request 200 can be conditioned upon whether the specific function or routine corresponding to that unique identifier is being executed, whether a particular peripheral device is active or inactive, as well as whether a particular process is active.

Figure 6:
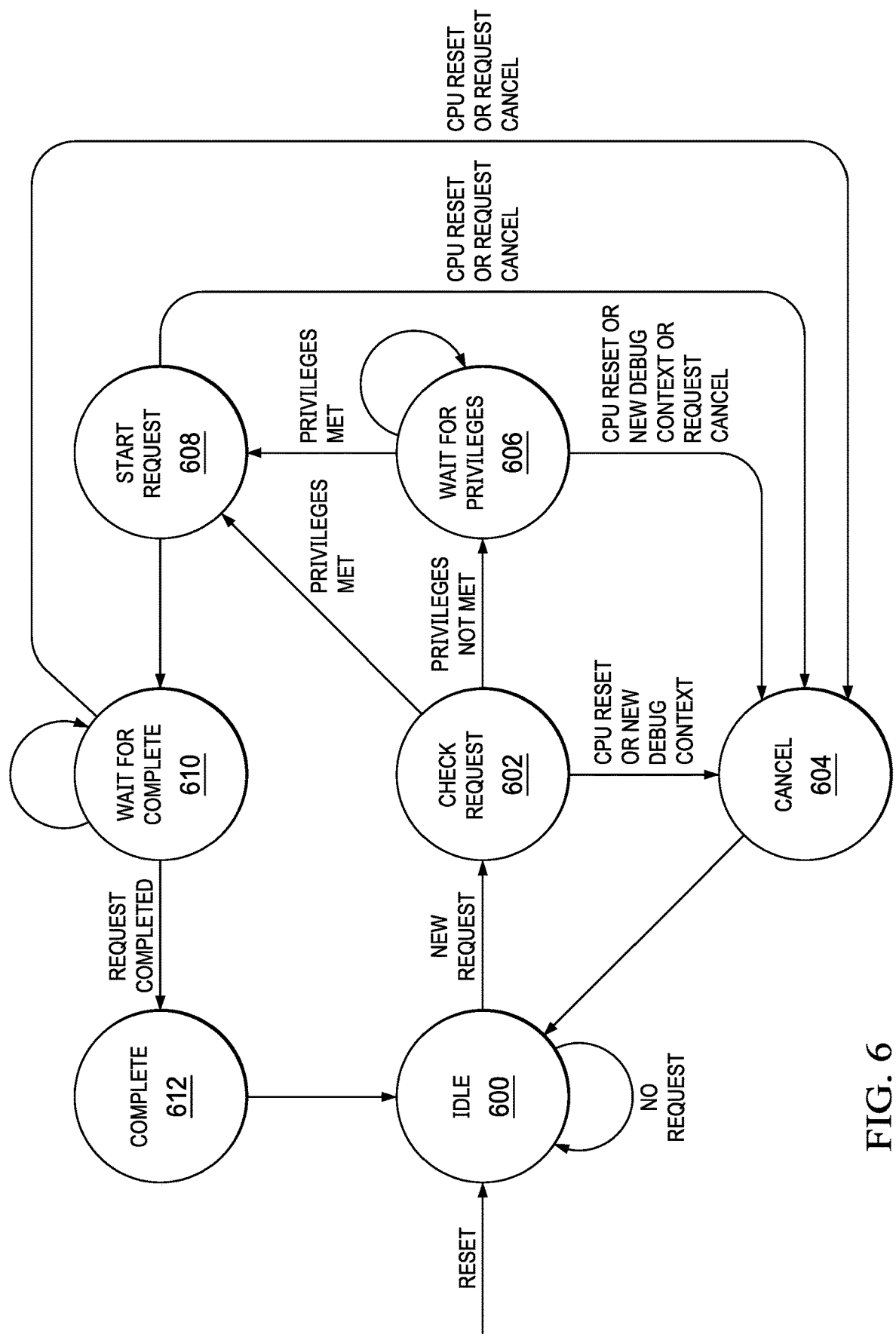
FIG. 6 is a state machine diagram illustrating how a context-sensitive debug request is processed by a processor in accordance with a disclosed embodiment.

FIG. 6 is a functional state machine diagram that illustrates the operation of processor 102 with respect to the servicing of context-sensitive debug requests 200. State 600 represents an idle state. Processor 102 remains in idle when no requests have been received, or will be initialized into an idle state when a reset condition occurs. A reset can be a defined architectural state that processor 102 enters in response to a reset event. For example, a reset may initialize one or more processor registers, such as a program counter, to a particular value.

When a new debug request is received, the current state changes from idle state 600 to check request state 602. In state 602, processor 102 determines what context-sensitive condition(s) are set (e.g., enabled) in the debug request (e.g., VMID, processor mode, debug context, etc.) and determines whether all of the enabled conditions are true. For example, the execution of process 400 in FIG. 4 may occur in state 602. If a reset event occurs or a new debug context is received while in state 602, the current state may change to canceled state 604, and then return to idle state 600.

Debug environments rely on a coherent view of a system, especially when it believes that it is suspended, for example, at a breakpoint. In real-time mode debug, it is possible for a processor to be suspended at a breakpoint, resumed by an interrupt, and then halted again by a new breakpoint while servicing the interrupt. A request as simple as restarting code execution can be ambiguous in this situation, since the debugger may be unaware if the code execution should be restarted from the first breakpoint or the second breakpoint. To provide a coherent view of the system under debug, new debug context informs the system when a new debug context occurs. For instance new debug context may be implemented as a flag that is set when a new debug event occurs and cleared when the debug environment becomes aware of the new debug context. When the new debug context is active and the user is unaware that the debug environment has changed, previously received debug requests that may be waiting for context-sensitive conditions to be met, may be based on assumptions about the state of the processor that may no longer be invalid since the new debug context takes priority. Accordingly, such requests are canceled to ensure that the user is not provided with incoherent data.

If processor 102 determines in state 602 that any of the conditional criteria (referred to as "privileges" here) specified in the request are not met, for instance, one or more of the conditional criteria is not true, the state machine transitions to the wait for privileges state 606 and can remain in state 606 while waiting for all of the conditions to become true. When all of the conditions become true while in state 606, the state machine transitions to the start request state 608 to begin servicing the debug request. As shown, while in state 606, if a processor reset event or new debug context occurs, or if a request to cancel the current request is received, then the current request is canceled (state 604) and the state machine returns to idle state 600. State 608 is also entered if at check request state 602, it is determined that all of the conditional criteria are true.

At state 608, servicing of the debug request begins. For example, a memory address or register identified in the request is accessed, which can be reading from or writing to the accessed location. The state machine transitions to state 610, which waits for processor 102 to complete servicing the debug request, at which point the state machine transitions to the complete state 612 and then back to the idle state 600. It is noted that in states 608 and 610, the request can be canceled (state 604) in response to a processor reset event or a cancel request, both of which will return the state machine to idle state 600.

Figure 7:
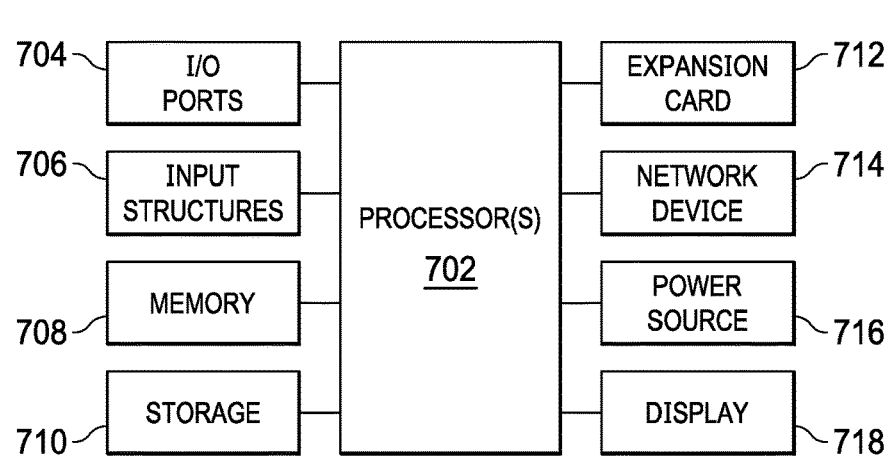
FIG. 7 is an example of an electronic device that includes a processor-based system in accordance a disclosed embodiment.

As discussed above, processor-based system 100 of FIG. 1 may encompass various types of electronic devices. FIG. 7 is a block diagram of a processor-based electronic device 700 that is configured to process context-sensitive debug requests in accordance with embodiments of this disclosure. Electronic device 700 includes processor 702, which may be identical or similar to processor 102 of FIG. 1. Electronic device 700 may be any type of device that operates based on execution of instructions by processor 702, such as a laptop or tablet computer, a desktop computer, a mobile phone (e.g., a smart phone), a digital media player, a computer system for a vehicle, and so forth.

Electronic device 700 may include various internal and/or external components contributing to its function. For instance, the various functional blocks shown in FIG. 7 may include hardware elements (including circuitry), software elements (including computer instructions stored on a tangible computer-readable medium) or a combination of both hardware and software elements. In the presently illustrated embodiment, electronic device 700, in addition to processor 702, also includes input/output (I/O) ports 704, input structures 706, memory device 708, non-volatile storage 710, expansion card(s) 712, network device 714, power source 716, and display 718.

I/O ports 704 may include ports configured to connect to a variety of external devices, such as a power source, headphones, or other electronic devices (such as handheld devices and/or computers, printers, external displays, docking stations, and so forth). I/O ports 704 may support any interface type, such as a universal serial bus (USB) port, a video output port, an IEEE-1394 port, a network connection port, and/or a power connection port. I/O ports 704 may further include a debug port, such as a JTAG port or a port that provides a memory mapped interface.

Input structures 706 may include the various devices, circuitry, and pathways by which user input or feedback is provided to processor 702. Such input structures 706 can be used to control a function of device 700, applications running on device 700, and/or any interfaces or devices connected to or used by device 700. For example, input structures 706 can allow a user to navigate a displayed graphical user interface. Examples of the input structures 706 include buttons, sliders, switches, control pads, keys, knobs, scroll wheels, keyboards, mice, touchpads, and so forth. In one embodiment, display 718 may be a touch screen display that includes touch-sensitive elements that are part of input structures 706.

Processor 702 controls the general operation of device 700. For instance, the processor(s) 700 may provide the processing capability to execute an operating system, programs, user and application interfaces, and any other functions of the device 700 while also supporting debugging based on context-sensitive debug requests, as described herein. Processor 702 may include one or more microprocessors, such as one or more general-purpose microprocessors, application-specific microprocessors (ASICs), embedded processors, digital signal processors (DSP), a system-on-a-chip (SOC), or graphics processors. By way of example only, processor 702 may be a model of a SOC processor, a digital signal processor, or a microcontroller available from Texas Instruments Incorporated of Dallas, Tex.

Instructions or data to be processed by processor 702 can be stored in a computer-readable medium, such as memory device 708, which can include volatile memory, such as random access memory (RAM), non-volatile memory, such as read-only memory (ROM), or a combination of RAM and ROM. Memory 708 may store a variety of information and may be used for various purposes. For example, memory 708 may store firmware for device 700, such as a basic input/output system (BIOS), an operating system, various programs, applications, or any other routines for execution by processor 702.

Non-volatile storage 710 provides persistent storage of data and/or instructions. Non-volatile storage 710 may include flash memory, a hard drive, or any other optical, magnetic, and/or solid-state storage media, or some combination thereof, and can be used to store firmware, data files, image data, software programs and applications, and any other suitable data. Device 700 can also include one or more expansion card slots for interfacing with expansion card 712. Expansion card 712 can be used to add functionality, such as additional memory, I/O functionality, or networking capability, to device 700. Expansion card 712 may connect to device 700 through any type of suitable connector, and may be accessed internally or externally with respect to a housing of device 700. In one embodiment, expansion card 712 includes a flash memory card, such as a Secure Digital (SD) card. In an embodiment where device 700 includes mobile network connectivity (e.g., a cellular phone), expansion card 712 may be a subscriber identity module (SIM) card.

Network device 714 can include RF circuitry enabling device 700 to connect to a network, such as a local area network, a wireless network, or a cellular data network, and to communicate with other devices over the network. Power source 716 may be one or more batteries and/or power circuitry for receiving AC power provided by an electrical outlet. Display 718 may display various images generated by device 700, such as a graphical user interface (GUI) for an operating system, or digital images or video stored on the device. Display 718 can include any suitable type of display including an LCD, plasma, or an organic LED (OLED) display.

As will be understood, the various techniques described above and relating to the servicing of context-sensitive debug requests are provided herein by way of example only. Accordingly, the present disclosure is not be construed as being limited to only the examples provided above. Further, it should be appreciated that the context-sensitive debug request techniques disclosed herein may be implemented in any suitable manner, including hardware (suitably configured circuitry), software (e.g., via a computer program including executable code stored on one or more tangible computer readable medium), or via using a combination of both hardware and software elements.

While the specific embodiments described above have been shown by way of example, it will be appreciated that many modifications and other embodiments will come to the mind of one skilled in the art having the benefit of the teachings presented in the foregoing description and the associated drawings. Accordingly, it is understood that various modifications and embodiments are intended to be included within the scope of the appended claims.

What is claimed is:

1. A processing device comprising:
a debug controller operable to issue a debug request that includes a conditional criteria; and
a processor core coupled to the debug controller, wherein:
the processor core includes a debug context register; and
the processor core is operable to:
store debug context information in the debug context register, wherein the debug request specifies a debug context mask that specifies a subset of the debug context information;
compare the conditional criteria of the debug request to the subset of the debug context information by applying the debug context mask to the debug context information to identify the subset of the debug context information; and
determine when to service the debug request based on the comparison of the conditional criteria of the debug request to the subset of the debug context information.

2. The processing device of claim 1, wherein:
the debug context mask further specifies a subset of the conditional criteria; and
the processor core is operable to compare the conditional criteria to the subset of the debug context information by:
applying the debug context mask to the conditional criteria to identify the subset of the conditional criteria; and
compare the subset of the conditional criteria to the subset of the debug context information.

3. The processing device of claim 1, wherein the determination of when to service the debug request includes delaying the debug request until the debug context information satisfies the conditional criteria.

4. The processing device of claim 1, wherein the debug context information includes a property from a group consisting of: an active process, an active thread, an active task, an identifier corresponding to an executable function, and a state of a peripheral device.

5. The processing device of claim 1, wherein:
the conditional criteria is a first conditional criteria; and
the debug request includes a second conditional criteria from a group consisting of a processor mode condition and a virtual machine identifier (VMID) condition.

6. The processing device of claim 5, wherein the processing core is operable to determine when to service the debug request based on the first conditional criteria and the second conditional criteria being met.

7. The processing device of claim 1, wherein:
the debug request includes a debug context qualifier that specifies whether the processor core is to compare the conditional criteria of the debug request to the debug context information; and
the processor core is operable to compare the conditional criteria of the debug request to the debug context information and to determine when to service the debug request based on the debug context qualifier.

8. The processing device of claim 1, wherein the debug request is serviced without suspending the processing core.

9. The processing device of claim 1, wherein:
the processor core is configured to couple to a memory;
the debug request specifies a read or a write of the memory; and
the processor core is configured to service the debug request by performing the read or the write of the memory.

10. The processing device of claim 1, wherein:
the processor core includes a second register;
the debug request specifies a read or a write of the second register; and
the processor core is configured to service the debug request by performing the read or the write of the second register.

11. A method comprising:
storing debug context information in a register of a processor;
receiving a debug request that includes a conditional criteria and a mask that specifies a subset of the debug context information;
comparing the conditional criteria to the subset of the debug context information by applying the mask to the debug context information to identify the subset of the debug context information; and
determining whether to delay or to service the debug request based on the comparing of the conditional criteria to the subset of the debug context information.

12. The method of claim 11, wherein:
the mask further specifies a subset of the conditional criteria; and
the comparing of the conditional criteria to the subset of the debug context information includes:
applying the mask to the conditional criteria to identify the subset of the conditional criteria; and
comparing the subset of the conditional criteria to the subset of the debug context information.

13. The method of claim 11, wherein the debug request includes a debug context qualifier that specifies whether to compare the conditional criteria to the debug context information.

14. The method of claim 11, wherein the debug context information includes a property from a group consisting of: an active process, an active thread, an active task, an identifier corresponding to an executable function, and a state of a peripheral device.

15. The method of claim 11, wherein:
the conditional criteria is a first conditional criteria; and
the debug request includes a second conditional criteria from a group consisting of a processor mode condition and a virtual machine identifier (VMID) condition.

16. The method of claim 15 wherein the determining of whether to delay or to service the debug request is further based on the second conditional criteria.

17. The method of claim 11, wherein:
the debug request specifies a read or a write of a memory; and
the method further comprises servicing the debug request by performing the read or the write of the memory.

18. A device comprising:
a processor core that includes a register, wherein the processor core is operable to:
store data in the register;
receive a debug request that includes a conditional criteria and that specifies the register, wherein the debug request specifies a mask that specifies a subset of the data in the register and a subset of the conditional criteria;
compare the subset of the conditional criteria of the debug request to the subset of the data in the register by applying the mask to the conditional criteria and to the data in the register; and
determine whether to delay servicing the debug request based on the comparison of the conditional criteria of the debug request to the subset of the data in the register.

19. The device of claim 18, wherein the register is a debug context register and the data includes debug context information.

20. The device of claim 19, wherein the debug context information includes a property from a group consisting of: an active process, an active thread, an active task, an identifier corresponding to an executable function, and a state of a peripheral device.

* * * * *